US012135035B2

(12) United States Patent
Hwang et al.

(10) Patent No.: US 12,135,035 B2
(45) Date of Patent: Nov. 5, 2024

(54) MOTOR ASSEMBLY AND CLEANER COMPRISING SAME

(71) Applicant: SAMSUNG ELECTRONICS CO., LTD., Suwon-si (KR)

(72) Inventors: Woong Hwang, Suwon-si (KR); Hyunjoo Kim, Suwon-si (KR); Taesang Park, Suwon-si (KR); Wonsoo Kang, Suwon-si (KR); Jimin Kim, Suwon-si (KR); Keeyeon Cho, Suwon-si (KR); Jinwoo Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 107 days.

(21) Appl. No.: 17/959,685

(22) Filed: Oct. 4, 2022

(65) Prior Publication Data
US 2023/0021359 A1   Jan. 26, 2023

Related U.S. Application Data

(63) Continuation of application No. PCT/KR2021/004553, filed on Apr. 12, 2021.

(30) Foreign Application Priority Data

Jun. 11, 2020 (KR) .......................... 10-2020-0070895

(51) Int. Cl.
*F04D 25/08* (2006.01)
*A47L 9/28* (2006.01)
*F04D 29/58* (2006.01)

(52) U.S. Cl.
CPC .......... *F04D 25/082* (2013.01); *A47L 9/2889* (2013.01); *F04D 29/5806* (2013.01); *F05D 2250/52* (2013.01); *F05D 2260/221* (2013.01)

(58) Field of Classification Search
CPC ... F04D 25/082; F04D 29/5806; A47L 9/2889
See application file for complete search history.

(56) References Cited

U.S. PATENT DOCUMENTS

| 5,925,947 A | 7/1999 | Kajiwara et al. |
| 9,030,064 B2 | 5/2015 | Haga et al. |
| (Continued) | | |

FOREIGN PATENT DOCUMENTS

| CN | 209516803 U | 10/2019 |
| JP | 9-149599 | 6/1997 |
| (Continued) | | |

OTHER PUBLICATIONS

International Search Report issued in International Application No. PCT/KR2021/004553 dated Jul. 22, 2021.
(Continued)

*Primary Examiner* — Kenneth J Hansen
(74) *Attorney, Agent, or Firm* — STAAS & HALSEY LLP

(57) ABSTRACT

A motor assembly has a motor having a rotor and a stator. An impeller is connected to a rotary shaft of the rotor and a housing is disposed between the impeller and the motor and surrounding an upper side of the motor. A diffuser discharges air, which is suctioned by the impeller, along an outer surface of the housing. A heat dissipation cover covers an outer surface of the motor. The heat dissipation cover includes an inner cover spaced apart from the outer surface of the motor and forming an inside-cover flow channel that air flows through and an outer cover having a diameter greater than that of the inner cover and forming an outside-cover flow channel through which air flows along the outer surface thereof.

13 Claims, 9 Drawing Sheets

(56) References Cited

U.S. PATENT DOCUMENTS

| | | | |
|---|---|---|---|
| 9,848,745 | B2 | 12/2017 | Hill et al. |
| 2013/0119795 | A1 | 5/2013 | Haga et al. |
| 2018/0177373 | A1 | 6/2018 | Hayamitsu |
| 2018/0180058 | A1 | 6/2018 | Hayamitsu et al. |
| 2018/0266426 | A1 | 9/2018 | Lee et al. |
| 2019/0027998 | A1* | 1/2019 | Takaki .................. F04D 29/624 |
| 2020/0124055 | A1 | 4/2020 | Choi et al. |
| 2021/0010486 | A1* | 1/2021 | Choi .................... F04D 25/0606 |
| 2022/0149674 | A1 | 5/2022 | Jang et al. |

FOREIGN PATENT DOCUMENTS

| | | |
|---|---|---|
| JP | 4846073 | 12/2011 |
| JP | 2018-84151 | 5/2018 |
| JP | 2018-105269 | 7/2018 |
| JP | 2021-80868 | 5/2021 |
| KR | 10-0474341 | 3/2005 |
| KR | 10-1924591 | 12/2018 |
| KR | 10-2019-0003259 | 1/2019 |
| KR | 10-1943963 | 1/2019 |
| KR | 10-2020-0044737 | 4/2020 |
| KR | 10-2020-0101747 | 8/2020 |

OTHER PUBLICATIONS

International Written Opinion issued in International Application No. PCT/KR2021/004553 dated Jun. 22, 2021.
Office Action dated Jul. 28, 2023, in European Patent Application No. 21821481.5.

* cited by examiner

MOTOR ASSEMBLY AND CLEANER COMPRISING SAME

CROSS-REFERENCE TO RELATED APPLICATIONS

This application is a continuation, filed under 35 USC 111(a), of International Application PCT/KR2021/004553, filed Apr. 12, 2021, and claims priority to Korean application 10-2020-0070895, filed Jun. 11, 2020, the disclosures of which are incorporated herein by reference in their entireties.

BACKGROUND

1. Field

The disclosure relates to a motor assembly and a cleaner including the same, and more particularly, to a motor assembly including a heat dissipation cover for improving a cooling effect and improving a suction performance of a motor, and a cleaner including the same.

2. Description of Related Art

In general, a cleaner is a device that suctions air of a surface to be cleaned, and separates dust or contaminated materials from the suctioned air and collects them, and discharges the purified air to the outside of the main body.

Such a cleaner can be divided into a cleaner of a canister type, a cleaner of an upright type, a hand type cleaner, a stick type cleaner, etc. according to forms.

A cleaner may include a motor that is driven to generate a suction force. The motor is a device acquiring a rotational force from electronic energy, and includes a stator and a rotor, and it may constitute a motor assembly together with an impeller that generates a suction force by rotating together with a rotor.

As the motor is driven, heat is generated by currents flowing in a coil of the stator. As the heat generated in the motor exerts influence on the performance and the lifespan of the motor, there is a need to cool the motor.

The motor is cooled through a flow of air that is generated by a rotation of the impeller. However, in a motor assembly according to the conventional technology, wind generated by the impeller mainly passed through the outer side of the motor, and does not flow adjacently to the motor or to the inner side of the motor, and thus a problem that the cooling effect was small existed.

SUMMARY

One embodiment is directed to a motor assembly that includes a stator having a space in a center of the stator, a rotor positioned in the space, the rotor having a rotary shaft, an impeller connected to the rotary shaft: a diffuser having a housing disposed between the impeller and the stator and surrounding an upper side of the stator, the diffuser configured to discharge air suctioned by the impeller along an outer side surface of the housing; and a heat dissipation cover covering at least a portion of an outer side surface of the stator, wherein the heat dissipation cover includes: an inner cover spaced apart from the outer side surface of the stator, to form an inside-cover flow channel between the inner cover and the outer side surface of the stator, the inside-cover flow channel providing a path for air intake, and an outer cover, having a diameter greater than that of the inner cover, and the outer cover spaced apart from the housing to form an outside-cover flow channel with the housing, the outside-cover flow channel providing a path for air discharge.

Another embodiment is directed to the motor assembly wherein air may be introduced into the inside of the housing through the inside-cover flow channel during rotation of the rotor, and the introduced air may be discharged through the outside-cover flow channel.

Another embodiment is directed to the motor assembly wherein a direction in which air is introduced into the inside of the housing through the inside-cover flow channel during rotation of the rotor may be an opposite direction to a direction in which air is discharged by the diffuser.

Another embodiment is directed to the motor assembly wherein a pressure of air suctioned by the impeller during rotation of the rotor may be lower than the pressure inside the housing.

Another embodiment is directed to the motor assembly wherein the stator includes a plurality of teeth that are spaced apart by a specific spacing in a circumferential direction, and coils wound around the plurality of teeth.

Another embodiment is directed to the motor assembly wherein, among the plurality of teeth, an inside-stator flow channel that penetrates the stator in upper and lower directions may be formed, and air may be introduced into the inside of the housing through the inside-stator flow channel during a rotation of the rotor.

Another embodiment is directed to the motor assembly wherein the diffuser may further include a plurality of diffuser vanes formed along the outer surface of the housing, and the plurality of diffuser vanes is configured to induce air suctioned by the impeller to flow along the outer side surface of the housing and the plurality of diffuser vanes.

Another embodiment is directed to the motor assembly wherein the outer cover may has a diameter corresponding to the diameter of the housing.

Another embodiment is directed to the motor assembly wherein the outer cover has a downward incline from an upper end of the inner cover.

Another embodiment is directed to the motor assembly wherein the inner cover and the outer cover have the same dimension in upper and lower directions.

Another embodiment is directed to a cleaner that includes a cleaner main body; a suction head configured to suction foreign materials of a surface to be cleaned to the cleaner main body; and a motor assembly disposed inside the cleaner main body, wherein the motor assembly includes: a stator having a space in a center of the stator, a rotor positioned in the space, the rotor having a rotary shaft, an impeller connected to the rotary shaft, a diffuser having a housing disposed between the impeller and the stator and surrounding an upper side of the stator, the diffuser configured to discharge air suctioned by the impeller along an outer side surface of the housing, and a heat dissipation cover covering at least a portion of an outer side surface of the stator, wherein the heat dissipation cover includes: an inner cover spaced apart from the outer side surface of the stator, to form an inside-cover flow channel between the inner cover and the outer side surface of the stator, the inside-cover flow channel providing a path for air intake and an outer cover, having a diameter greater than that of the inner cover, and the outer cover spaced apart from the hosing to form an outside-cover flow channel with the housing, the outside-cover flow channel providing a path for air discharge.

Another embodiment is directed to the cleaner wherein air is introduced into the inside of the housing through the inside-cover flow channel during rotation of the rotor, and the introduced air is discharged through the outside-cover flow channel.

Another embodiment is directed to the cleaner wherein a direction in which air is introduced into the inside of the housing through the inside-cover flow channel during rotation of the rotor may be an opposite direction to a direction in which air is discharged by the diffuser.

Another embodiment is directed to the cleaner wherein a pressure of air suctioned by the impeller during rotation of the rotor may be lower than a pressure inside the housing.

DETAILED DESCRIPTION

Figure 1:
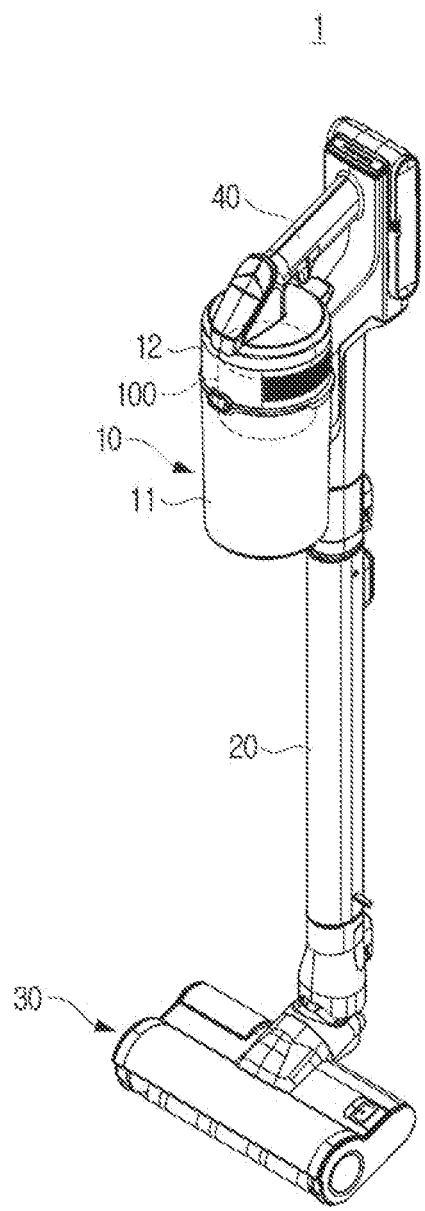
FIG. 1 is a perspective view of a stick type cleaner including a motor assembly according to an embodiment of the disclosure.

The embodiments described below are exemplary embodiments for promoting understanding of the disclosure, and it should be noted that the disclosure may be implemented while being modified in various forms, unlike the embodiments described herein. In explaining the disclosure below, in case it is determined that detailed explanation of related known functions or components may unnecessarily confuse the gist of the disclosure, the detailed explanation and detailed illustration will be omitted. Also, in the accompanying drawings, some components may not be illustrated according to their actual sizes but they may be illustrated in exaggerated sizes, for promoting understanding of the disclosure.

Further, as terms used in this specification and the claims, general terms were selected, in consideration of the functions described in the disclosure. However, the terms may vary depending on the intention of those skilled in the art, legal or technical interpretation, or emergence of new technologies. Also, there are some terms that were arbitrarily designated by the applicant, and the meaning of such terms may be interpreted as defined in this specification. Terms that are not specifically defined in the disclosure may be interpreted based on the overall content of the disclosure and common technical knowledge in the pertinent art.

In addition, in the description of the disclosure, the order of each step should be understood in a nonrestrictive way, unless a preceding step should necessarily be performed prior to a subsequent step in a logical and temporal sense. That is, excluding an exceptional case as above, even if a process described as a subsequent step is performed prior to a process described as a preceding step, there would be no influence on the essence of the disclosure, and the scope of the disclosure should also be defined regardless of the orders of steps. Also, in this specification, expressions such as "have," "may have," "include," and "may include" denote the existence of such characteristics (e.g.: elements such as numbers, functions, operations, and components), and do not exclude the existence of additional characteristics.

In addition, terms such as "first," "second" and the like may be used to describe various elements, but it is not intended that the elements are limited by the terms. Such terms are used only to distinguish one element from another element. For example, a first element may be called a second element, and a second element may be called a first element in a similar manner, without departing from the scope of the disclosure.

Further, terms such as 'the front surface,' 'the rear surface,' 'the top surface,' 'the bottom surface,' 'the side surface,' 'the left side,' 'the right side,' 'the upper part,' 'the lower part', etc. used in the disclosure were defined based on the drawings, and the shapes and locations of respective elements are not limited by these terms.

Also, in this specification, elements necessary for description of each embodiment of the disclosure were explained, and thus elements are not necessarily limited thereto. Accordingly, some elements may be modified or omitted, or other elements may be added. In addition, elements may be disposed while being dispersed to devices independent from one another.

Further, while the embodiments of the disclosure will be described in detail with reference to the following accompanying drawings and the content described in the accompanying drawings, it is not intended that the disclosure is restricted or limited by the embodiments.

This disclosure addresses aforementioned problems, and provides a motor assembly including a heat dissipation cover that forms a bypass flow channel so that air flows adjacently to a motor for improving a cooling effect and improving a suction performance of the motor. Also described is a cleaner including the motor assembly.

Hereinafter, the disclosure will be described in more detail with reference to FIG. 1 to FIG. 9.

FIG. 1 is a perspective view of a stick type cleaner 1 including a motor assembly 100 according to an embodiment of the disclosure.

Referring to FIG. 1, a cleaner including the motor assembly 100 according to an embodiment of the disclosure may include the stick type cleaner 1. However, the disclosure is not limited thereto, and the motor assembly 100 according to an embodiment of the disclosure may be applied to various devices. For example, the cleaner 1 according to an embodiment of the disclosure may be an upright type cleaner.

Also, the motor assembly 100 according to an embodiment of the disclosure may be applied to various home appliances other than cleaners. Hereinafter, explanation will be made by suggesting the stick type cleaner 1 including the motor assembly 100 as an example.

The cleaner 1 may include a cleaner main body 10 and a suction head 30. Also, the cleaner 1 may include a stick 20 connecting the cleaner main body 10 and the suction head 30, and a handle part 40 connected to the cleaner main body 10.

The handle part 40 is a part coupled to the cleaner main body 10, and it may be provided so that a user can grip it and manipulate the cleaner 1. On the handle part 40, a manipulation part (not shown) is provided, and a user can control the cleaner 1 by the manipulation part.

The suction head 30 may be provided in the lower part of the cleaner main body 10, and may be disposed to contact a surface to be cleaned. The suction head 30 may be provided to contact a surface to be cleaned, and hoover dust or contaminated materials of the surface to be cleaned into the inside of the cleaner main body 10 by a suction force generated from the motor assembly 100.

The cleaner main body 10 may include a collecting device 11 and a driving device 12 disposed in its inside. The collecting device 11 may perform a function of separating foreign materials from air suctioned in the suction head 30, and collecting the foreign materials.

The driving device 12 may include a motor assembly 100 provided to drive the cleaner 1. The motor assembly 100 may generate a dynamic force so that a suction force is generated inside the cleaner main body 10.

Figure 2:
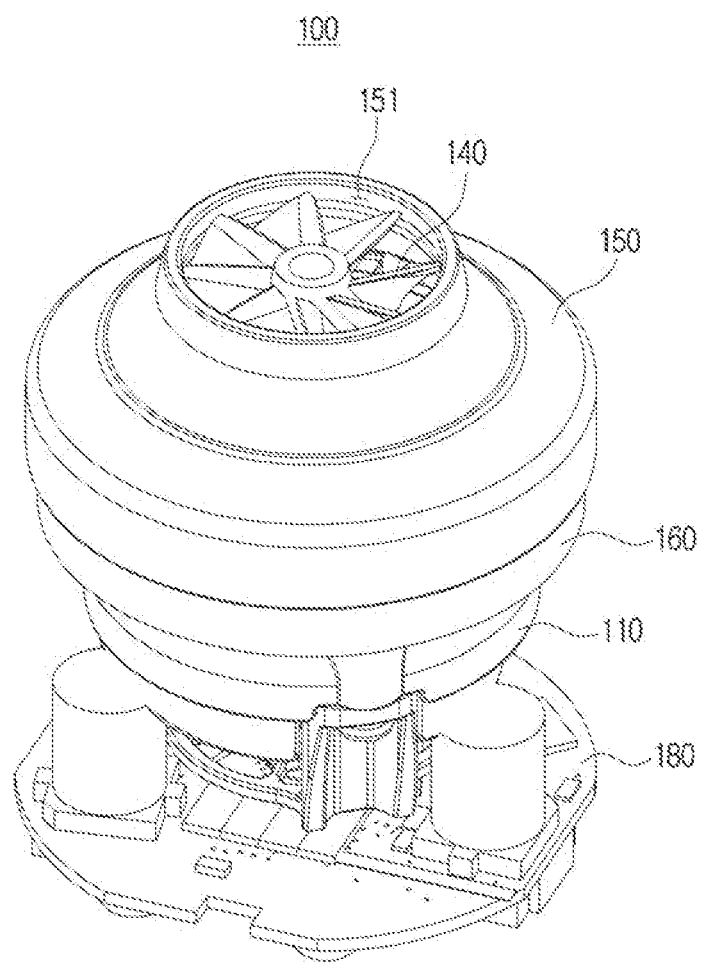
FIG. 2 is a perspective view of a motor assembly according to an embodiment of the disclosure.
Figure 3:
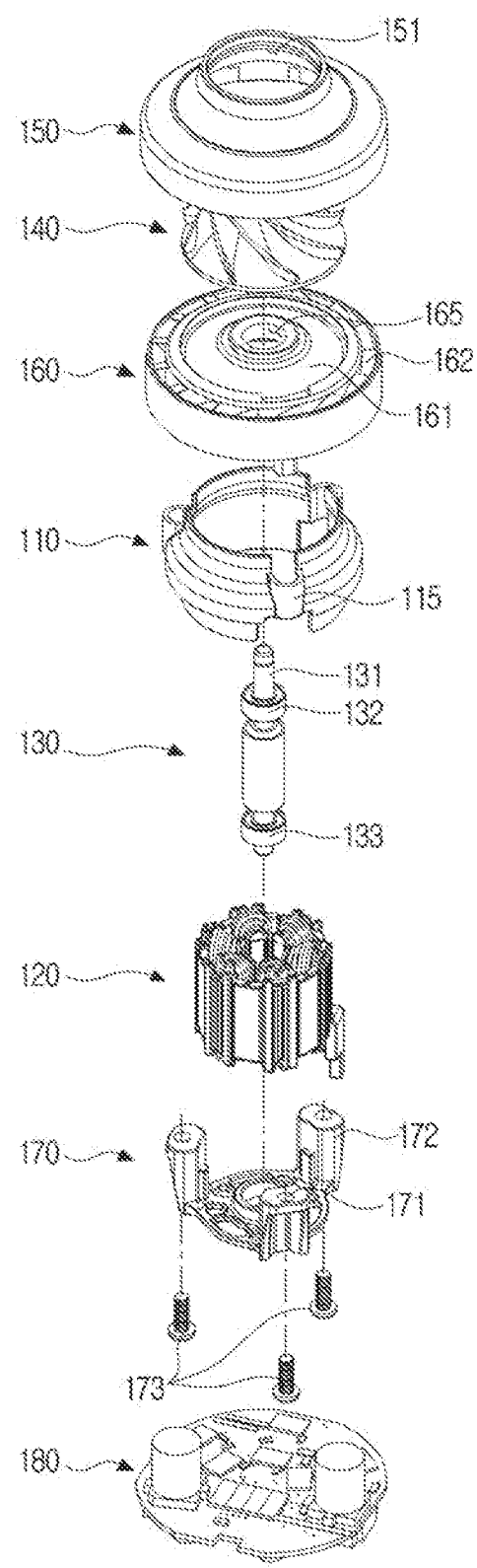
FIG. 3 is an exploded perspective view of a motor assembly according to an embodiment of the disclosure.

FIG. 2 is a perspective view of the motor assembly 100 according to an embodiment of the disclosure, and FIG. 3 is an exploded perspective view of the motor assembly 100 according to an embodiment of the disclosure.

Referring to FIG. 2 and FIG. 3, the motor assembly 100 may include a motor including a stator 120 and a rotor 130, housings 161, 170 supporting the motor, an impeller 140, an impeller cover 150, a diffuser 160, a heat dissipation cover 110, and a board 180 controlling the motor assembly 100.

The stator 120 may be constituted to generate a magnetic flux when currents are applied to coils 123 (refer to FIG. 4) wound around the stator 120.

In the center part of the stator 120, a space 122 (refer to FIG. 4) for accommodating the rotor 130 may be formed. The rotor 130 may be provided to rotate through an electromagnetic interaction with the stator 120. In this case, the rotor 130 may include a rotary shaft 131 and bearings 132, 133.

The impeller 140 may be coupled with the rotary shaft 131 of the rotor 130 and rotate, and thereby generate a flow of air. The impeller cover 150 may be disposed to cover the impeller 140, and guide the flow of air generated by the impeller 140 to a predetermined direction.

The diffuser 160 may be disposed between the impeller 140 and the motor, and guide air discharged from the impeller 140 to the motor side. For example, the diffuser 160 may include a housing 161 surrounding the upper side of the motor, and a plurality of diffuser vanes 162 formed along the outer surface of the housing 161. The air discharged from the impeller 140 may be introduced into the motor side along the outer surface of the housing 161 and the diffuser vanes 162.

Heat may be generated in the coils 123 by currents applied to the coils 123, and this may exert influence on the stator 120 and the rotor 130. For example, if excessive heat is generated in the coils 123, the stator 120 and the rotor 130 may be overheated and the performance of the motor may be deteriorated, or the coils 123 may be damaged.

For cooling the motor effectively, a heat dissipation cover 110 that is spaced apart by a predetermined spacing from the motor may be disposed on the side surface of the motor. The heat dissipation cover 110 may have a structure inducing some of the air generated from the impeller 140 and discharged through the diffuser 160 to flow adjacently to the motor.

Detailed explanation regarding the structure of the heat dissipation cover 110 and the effective cooling operation of the motor according to the arrangement inside the motor assembly 100 will be described below in FIG. 4 to FIG. 9.

Hereinafter, the basic structure of the motor assembly 100 will be described.

The bearings 132, 133 of the rotor 130 may include a first bearing 132 coupled to the upper side of the rotary shaft 131, and a second bearing 133 coupled to the lower side of the rotary shaft 131.

The first bearing 132 may be disposed between the housing 161 and the rotary shaft 131, and support such that the rotary shaft 131 rotates while the rotation axis of the rotary shaft 131 is fixed.

The second bearing 133 may be disposed between the housing 170 in the lower part of the motor and the rotary shaft 131, and support such that the rotary shaft 131 rotates while the rotation axis of the rotary shaft 131 is fixed.

The housing 161 may include a first bearing receiving part 165 on which the first bearing 132 is received, and the housing 170 in the lower part of the motor may include a second bearing receiving part 171 on which the second bearing 133 is received and second coupling parts 172 that are provided to be coupled with the heat dissipation cover 110.

The second coupling parts 172 may be provided in a number corresponding to the number of the first coupling parts 115 of the heat dissipation cover 110. The first coupling parts 115 and the second coupling parts 172 may be coupled by various known methods. For example, the first coupling parts 115 and the second coupling parts 172 may be coupled through a screw coupling by using bolts 173.

An arrangement of the heat dissipation cover 110 in the motor assembly 100 and the operation that permits efficient cooling of the motor will be described in detail with reference to FIG. 4 to FIG. 9.

Figure 4:
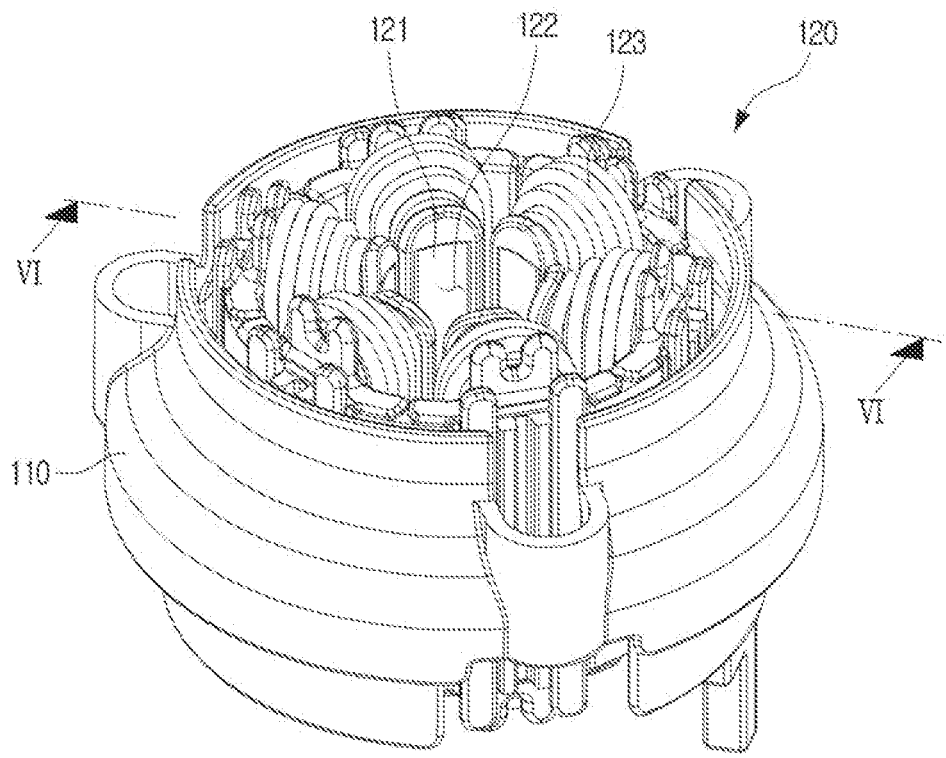
FIG. 4 is a perspective view illustrating a heat dissipation cover and a stator according to an embodiment of the disclosure.

FIG. 4 is a perspective view illustrating the heat dissipation cover 110 and the stator 120 according to an embodiment of the disclosure.

Referring to FIG. 4, the stator 120 may include a plurality of teeth 121 spaced apart by a specific spacing in a circumferential direction, and coils 123 wound around each of the plurality of teeth 121. On the inner side of the stator 120, a space 122 wherein the rotor 130 can be disposed may exist.

The heat dissipation cover 110 may be in a form surrounding the outer side surface of the stator 120 in a circumferential direction. In this case, the heat dissipation cover 110 may be disposed to be spaced apart by a predetermined spacing from the stator 120. Accordingly, between the heat dissipation cover 110 and the stator 120, a flow channel through which air can flow may be formed.

The operation by which the motor is cooled by the structure of the heat dissipation cover 110 according to an embodiment of the disclosure will be described with reference to FIG. 5 to FIG. 9.

Figure 5:
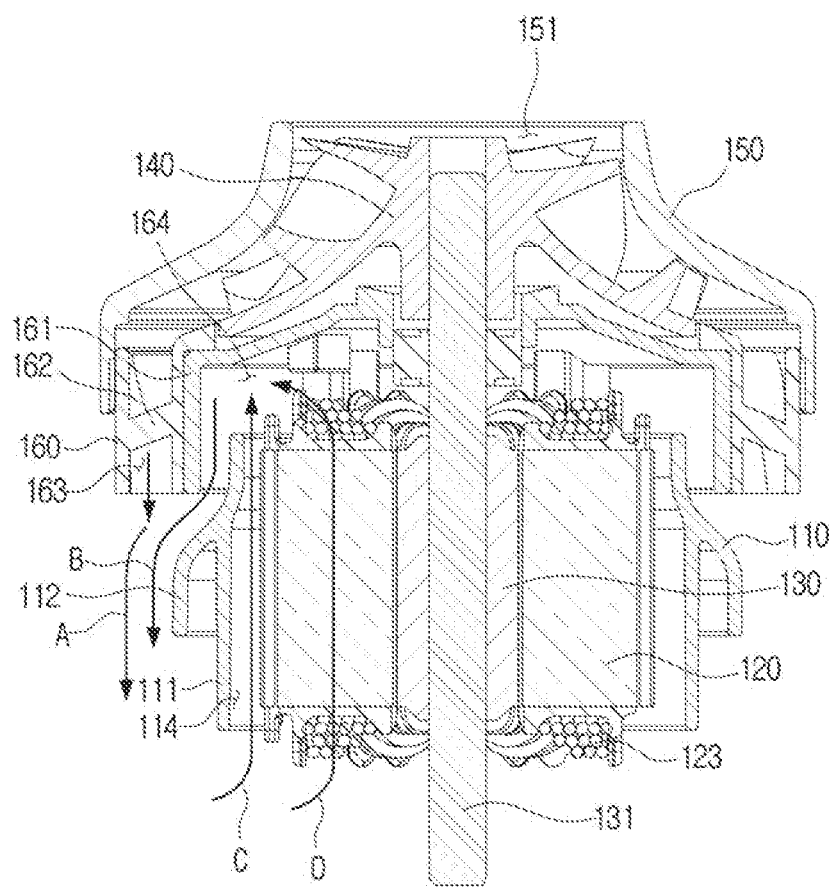
FIG. 5 is a cross-sectional view of a motor assembly according to an embodiment of the disclosure.
Figure 6:
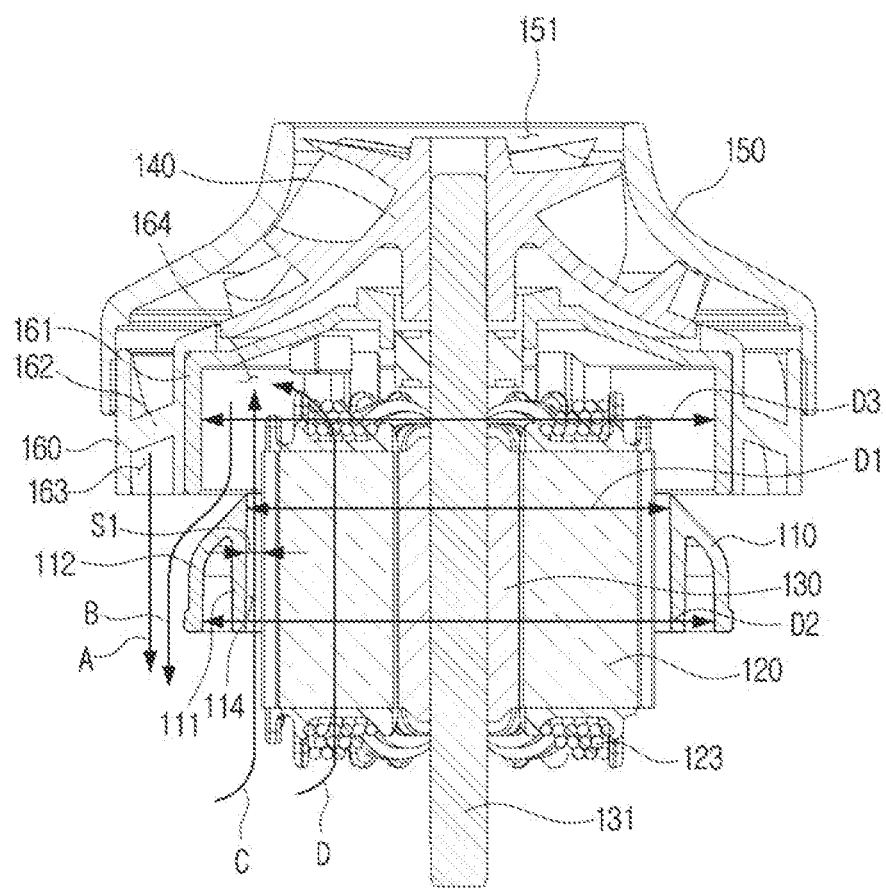
FIG. 6 is a cross-sectional view of a motor assembly according to another embodiment of the disclosure.
Figure 7:
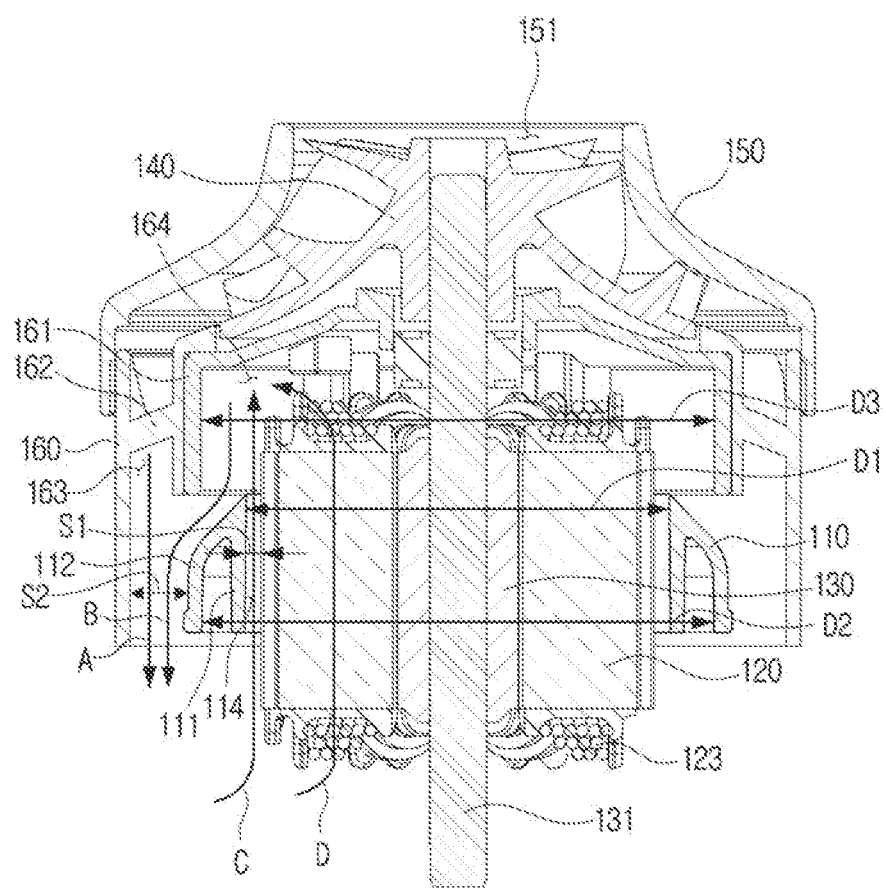
FIG. 7 is a cross-sectional view of a motor assembly according to still another embodiment of the disclosure.
Figure 8:
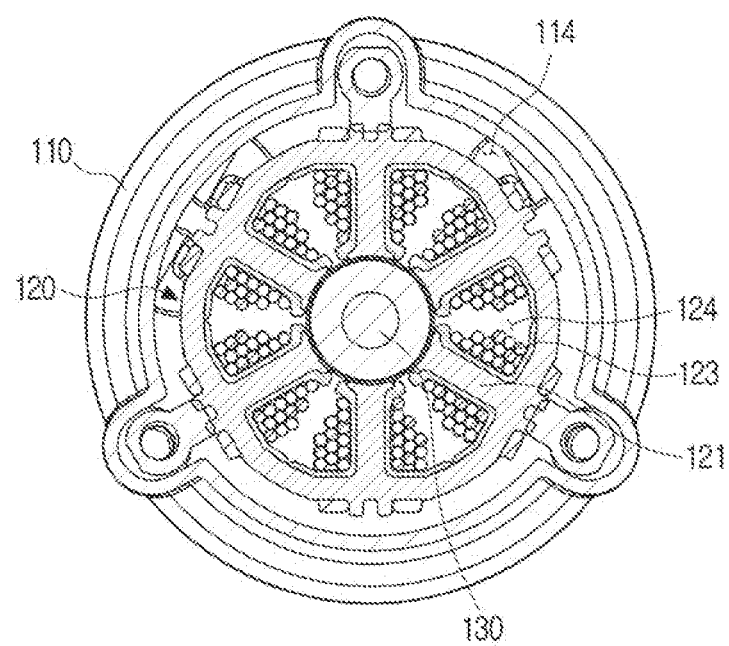
FIG. 8 is a cross-sectional view which cut the motor assembly along VI-VI in FIG. 4.
Figure 9:
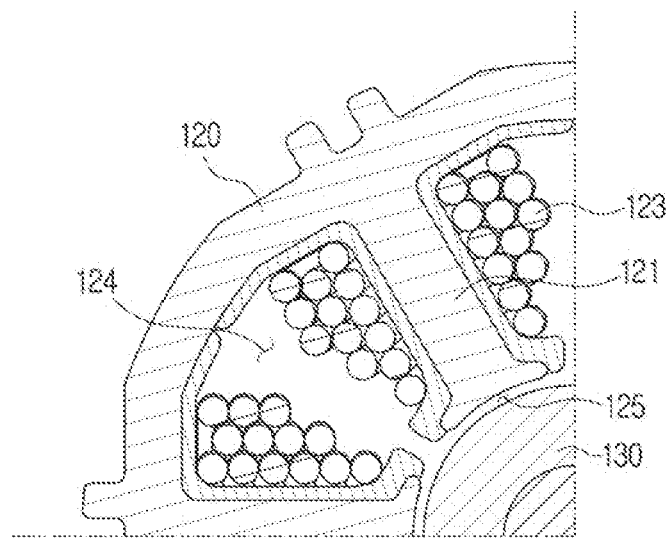
FIG. 9 is a cross-sectional view illustrating a portion of FIG. 8 in an enlarged size.

FIG. 5 is a cross-sectional view of the motor assembly 100 according to an embodiment of the disclosure. FIG. 6 is a cross-sectional view of the motor assembly 100 according to another embodiment of the disclosure. FIG. 7 is a cross-sectional view of the motor assembly 100 according to yet another embodiment of the disclosure. FIG. 8 is a cross-sectional view of the motor assembly 100 along VI-VI in FIG. 4. FIG. 9 is a cross-sectional view illustrating a portion of FIG. 8 in an enlarged size.

Referring to FIG. 5, the diffuser 160 may include a housing 161 disposed between the impeller 140 and the stator 120, and disposed to surround the upper side of the motor including the stator 120.

The diffuser 160 may include a plurality of diffuser vanes 162 (refer to FIG. 3) formed along the outer side surface of the housing 161.

The heat dissipation cover 110 may be disposed to cover the outer side surface of the motor. In this case, the heat dissipation cover 110 may include an inner cover 111 disposed to be spaced apart from the outer side surface of the motor, and forming an inner-cover flow channel C along which air flows through the spacing 114 therebetween, and an outer cover 112 having a diameter greater than that of the inner cover 111, and forming an outside-cover flow channel B through which air flows along the outer surface thereof.

A detailed explanation regarding the structures of the inner cover 111 and the outer cover 112, and a flow of air in a flow channel formed in accordance thereto will be described below.

When the motor operates, the impeller 140 connected to the rotary shaft 131 of the rotor 130 may rotate, and generate a suction force. Accordingly, the impeller 140 may introduce air into the inside of the motor assembly 100 through the inlet 151 of the impeller cover 150.

Referring to FIG. 5, the air suctioned by the impeller 140 may flow along the outer surface of the housing 161 of the diffuser 160 and the diffuser vanes 162, and may be discharged through the outlet 163 of the diffuser 160. Accordingly, an air discharge flow channel A through which the air suctioned by the impeller 140 is discharged to the outside of the motor assembly 100 may be formed.

In this case, the air discharged through the outlet 163 of the diffuser 160 may have relatively faster speed than the air of the inside 164 of the housing 161. Hereinafter, a flow of air inside the motor assembly 100 will be described with reference to air flow channels A, B, C, D illustrated in Formula 1 expressing the Bernoulli's theorem and FIG. 5.

$$P + \rho gh + \frac{1}{2}\rho v^2 = C \qquad \text{[Formula 1]}$$

Formula 1 expresses the Bernoulli's theorem as a formula, and P means pressure, ρ means density, g means acceleration of gravity, h means height, v means speed, and C means a constant. Referring to the Formula 1 above, the value of C is constant, and accordingly, if the speed v becomes bigger, the value of the pressure P becomes smaller. Accordingly, the pressure of the air discharged through the diffuser 160 may be lower than the pressure of the inside 164 of the housing 161.

A flow of air is generated from an area having high pressure to an area having low pressure. Thus, when the motor rotates, a flow of air may be generated from the inside 164 of the housing 161 having relatively higher pressure to the side of the outlet 163 of the diffuser 160. Accordingly, an outside-cover flow channel B may be formed.

In this case, the flow of air in the outside-cover flow channel B may be guided by the outer cover 112. The outer cover 112 may have a structure that has a bigger diameter than that of the inner cover 111 disposed to surround the outer side surface of the stator 120, and that is projectingly formed from the inner cover 111.

When the air of the inside 164 of the housing 161 is discharged to the side of the outlet 163 due to the difference in pressure between the side of the outlet 163 and the inside 164 of the housing, the air may be introduced into the inside 164 of the housing through the inside-cover flow channel C formed by the inner cover 111 of the heat dissipation cover 110.

Accordingly, a flow of air is generated in the spacing 114 between the inner cover 111 adjacent to the stator 120 and the outer side surface of the stator 120, and thus the stator 120 can be cooled effectively.

Referring to FIG. 8, the stator 120 may include an inside flow channel 124 that penetrates the motor in upper and lower directions. The inside flow channel 124 may be a space formed between the coils 123 wound around the plurality of different teeth 121.

As in the spacing 114 between the inner cover 111 and the outer side surface of the stator 120 described above, air may be introduced into the inside 164 of the housing through the inside flow channel 124. Referring to FIG. 5, in case the air of the inside 164 of the housing is discharged to the side of the outlet 163, an inside-stator flow channel D wherein air is introduced into the inside 164 of the housing through the inner flow channel 124 formed on the inner side of the stator 120 may be formed.

Accordingly, through the flow of air generated in the inner flow channel 124, the coils 123 wherein heat is generated can be cooled directly.

Also, as the magnet inside the motor and the bearings 132, 133 can be cooled through the flow of air generated on the inner side of the stator 120, the lifespan of the motor including the stator 120 and the rotor 130 can increase, and the performance of the motor can be improved.

Referring to FIG. 9, a spacing 125 may exist between the plurality of teeth 121 of the stator 120 and the rotor 130. As air flows to the inside 164 of the housing through the inner flow channel 124, air may flow to the inside 164 of the housing through the spacing 125 between the plurality of teeth 121 and the rotor 130.

Accordingly, through the flow of air generated in the spacing 125 between the plurality of teeth 121 and the rotor 130, the stator 120 and the rotor 130 can be cooled effectively.

As shown in FIG. 6 and FIG. 7, the cooling effect of the motor assembly 100 can be improved by changing the structures of the inner cover 111 and the outer cover 112 of the heat dissipation cover 110.

The cooling effect of the motor assembly 100 including the heat dissipation cover 110 according to another embodiment of the disclosure will be described with reference to FIG. 6 and FIG. 7.

FIG. 6 is a cross-sectional view of the motor assembly 100 according to another embodiment of the disclosure.

Referring to FIG. 6, the outer cover 112 may be projectingly formed from the inner cover 111 while forming a specific incline, and the diameter D2 of the outer cover may be formed to be bigger than the diameter D1 of the inner cover. The diameter D2 of the outer cover was set based on the location having the biggest diameter in the inner diameter of the outer cover 112, for the convenience of explanation.

The diameter D2 of the outer cover may be formed to coincide with the inner diameter D3 of the housing 161, or formed in a size within a range of bigger than or smaller than the inner diameter D3 of the housing by 10%. In case the diameter D2 of the outer cover 112 coincides with the inner diameter D3 of the housing, the cooling effect can be improved more than when the diameter does not coincide.

The inner side surface of the housing 161 is formed to have an incline, the cooling effect of the motor assembly 100 can be improved by forming the outer cover 112 to have an incline corresponding to the inner side surface of the housing 161.

Based on the direction illustrated in FIG. 6, the outer cover 112 may be formed to have a downward incline from the upper end of the inner cover 111. In this case, the inner cover 111 and the outer cover 112 may be formed to have the same height in upper and lower directions. In case the inner cover 111 and the outer cover 112 have the same height, the cooling effect can be improved more than when the inner cover 111 and the outer cover 112 have different heights.

The heat dissipation cover 110 may include only the outer cover 112 without a shape corresponding to the inner cover 111. In this case, the cooling effect decreases compared to a case of including the inner cover 111, but a more improved cooling effect can be achieved than in the case of a motor assembly to which the heat dissipation cover 110 is not applied.

As the diameter D1 of the inner cover 111 is smaller, the spacing S1 between the inner cover 111 and the outer side surface of the stator 120 becomes smaller, and thus the flow speed of air passing through the inside-cover flow channel C becomes faster, and the flow amount of air can increase. Accordingly, the cooling effect of the stator 120 can be improved.

However, if the inner cover 111 contacts the stator 120, the cooling effect decreases. Accordingly, for preventing vibration of the stator 120 from being transmitted to the heat dissipation cover 110 when the motor operates, the inner cover 111 may be disposed to be spaced apart so that a specific spacing is formed between the inner cover 111 and the stator 120.

The inner cover 111 may be formed to surround the entire outer side surface of the stator 120 (refer to the embodiment of FIG. 5), but referring to FIG. 6, the inner cover 111 may be formed to surround a portion of the outer side surface of the stator 120. For example, the inner cover 111 may not be extensively formed to the upper part of the area to which the outer cover 112 is connected in the inner cover 111, and the inner cover 111 and the outer cover 112 may be formed to have the same height in upper and lower directions.

In case there is no structure wherein the inner cover 111 is extensively formed in upper and lower directions compared to the outer cover 112, a flow of air is formed smoothly in a flow channel formed by the heat dissipation cover 110, and accordingly, the cooling effect of the stator 120 can be improved.

The shape of the heat dissipation cover 110 is projectingly formed, as illustrated in FIG. 6, such that the inner cover 111 surrounds a portion of the outer side surface of the stator 120, and the outer cover 112 has a downward incline from the upper end of the inner cover 111. Also, in case the diameter D2 of the outer cover coincides with the inner diameter D3 of the housing, and the inner cover 111 and the outer cover 112 are formed to have the same height in upper and lower directions, i.e., in case there is no structure wherein the inner cover 111 is extensively formed in upper and lower directions compared to the outer cover 112, the most improved cooling effect can be achieved.

FIG. 7 is a cross-sectional view of the motor assembly 100 according to still another embodiment of the disclosure.

Referring to FIG. 7, the outer side surface of the diffuser 160 may be extensively formed in the air discharging direction of the outlet 163, and form an air discharge flow channel A.

In this case, as the spacing S2 between the outer side surface of the diffuser 160 extensively formed and the outer cover 112 is smaller, the flow speed of air passing through the air discharge flow channel A may become faster, and the flow amount of air may increase. Accordingly, the cooling effect of the stator 120 can be improved.

While preferred embodiments of the disclosure have been shown and described, the disclosure is not limited to the aforementioned specific embodiments, and it is apparent that various modifications can be made by those having ordinary skill in the art to which the disclosure belongs, without departing from the gist of the disclosure as claimed by the appended claims. Further, it is intended that such modifications are not to be interpreted independently from the technical idea or prospect of the disclosure.

What is claimed is:

1. A motor assembly comprising:
a stator having a space in a center of the stator;
a rotor positioned in the space, the rotor having a rotary shaft;
an impeller connected to the rotary shaft;
a diffuser having a housing disposed between the impeller and the stator and surrounding an upper side of the stator, and an outlet outside of an outer side surface of the housing, the diffuser configured to discharge air suctioned by the impeller and flowing along the outer side surface of the housing through the outlet; and
a heat dissipation cover covering at least a portion of an outer side surface of the stator,
wherein the heat dissipation cover includes:
an inner cover spaced apart from the outer side surface of the stator, to form an inside-cover flow channel between the inner cover and the outer side surface of the stator through which air is introduced into an inside of the housing during rotation of the rotor, and
an outer cover, having a diameter greater than that of the inner cover, and the outer cover spaced apart from the housing to form an outside-cover flow channel with the housing through which the introduced air is discharged.

2. The motor assembly of claim 1, wherein a direction in which air is introduced into the inside of the housing through the inside-cover flow channel during rotation of the rotor is an opposite direction to a direction in which air is discharged by the diffuser through the outlet.

3. The motor assembly of claim 1, wherein a pressure of air suctioned by the impeller during rotation of the rotor is lower than a pressure inside the housing.

4. The motor assembly of claim 1, wherein the stator includes a plurality of teeth that are spaced apart by a specific spacing in a circumferential direction, and coils wound around the plurality of teeth.

5. The motor assembly of claim 4, wherein,
among the plurality of teeth, an inside-stator flow channel that penetrates the stator in upper and lower directions is formed, and
air is introduced into the inside of the housing through the inside-stator flow channel during rotation of the rotor.

6. The motor assembly of claim 1, wherein the diffuser further comprises:
a plurality of diffuser vanes formed along the outer side surface of the housing, and
the plurality of diffuser vanes is configured to induce air suctioned by the impeller to flow along the outer side surface of the housing and the plurality of diffuser vanes.

7. The motor assembly of claim 1, wherein the outer cover has a diameter corresponding to the diameter of the housing.

8. The motor assembly of claim 1, wherein the outer cover has a downward incline from an upper end of the inner cover.

9. The motor assembly of claim 8, wherein the inner cover and the outer cover have the same dimensions in upper and lower directions.

10. A cleaner comprising:
a cleaner main body;
a suction head configured to suction foreign materials of a surface to be cleaned to the cleaner main body; and
a motor assembly disposed inside the cleaner main body, wherein the motor assembly includes:
- a stator having a space in a center of the stator,
- a rotor positioned in the space, the rotor having a rotary shaft,
- an impeller connected to the rotary shaft,
- a diffuser having a housing disposed between the impeller and the stator and surrounding an upper side of the stator, and an outlet outside of an outer side surface of the housing, the diffuser configured to discharge air suctioned by the impeller and flowing along the outer side surface of the housing through the outlet, and
- a heat dissipation cover covering at least a portion of an outer side surface of the stator,
wherein the heat dissipation cover includes:
- an inner cover spaced apart from the outer side surface of the stator, to form an inside-cover flow channel between the inner cover and the outer side surface of the stator through which air is introduced into an inside of the housing during rotation of the rotor, and
- an outer cover, having a diameter greater than that of the inner cover, and the outer cover spaced apart from the housing to form an outside-cover flow channel with the housing through which the introduced air is discharged.

11. The cleaner of claim 10, wherein a direction in which air is introduced into the inside of the housing through the inside-cover flow channel during rotation of the rotor is an opposite direction to a direction in which air is discharged by the diffuser.

12. The cleaner of claim 10, wherein a pressure of air suctioned by the impeller during rotation of the rotor is lower than a pressure inside the housing.

13. A motor assembly comprising:
- a stator having a space in a center of the stator;
  - a rotor positioned in the space, the rotor having a rotary shaft;
- an impeller connected to the rotary shaft;
- a diffuser having a housing disposed between the impeller and the stator and surrounding an upper side of the stator, the diffuser configured to discharge air suctioned by the impeller along an outer side surface of the housing; and
- a heat dissipation cover covering at least a portion of an outer side surface of the stator,
wherein the heat dissipation cover includes:
an inner cover spaced apart from the outer side surface of the stator, to form an inside-cover flow channel between the inner cover and the outer side surface of the stator, and
an outer cover, having a diameter that is greater than a diameter of the inner cover and that corresponds to a diameter of the housing, wherein the outer cover is spaced apart from the housing to form an outside-cover flow channel with the housing.

* * * * *